United States Patent [19]
Fairchild et al.

[11] Patent Number: 5,956,441
[45] Date of Patent: Sep. 21, 1999

[54] MULTIPLE PORT OPTICAL COMPONENT SUCH AS AN ISOLATER OR THE LIKE

[75] Inventors: Stephen Kenneth Fairchild, Maxatawny Township; Reinhard Heinrich Knerr, Upper Macungie Township, both of Pa.; Stephen Charles McClain, Tucson, Ariz.; Neal Henry Thorsten, Lebanon, N.J.

[73] Assignee: Lucent Technologies, Inc., Murray Hill, N.J.

[21] Appl. No.: 08/872,283

[22] Filed: Jun. 10, 1997

Related U.S. Application Data

[60] Provisional application No. 60/019,952, Jun. 14, 1996.

[51] Int. Cl.$^6$ ..................................................... G02B 6/26
[52] U.S. Cl. ............................... 385/27; 385/33; 385/31; 372/703; 359/131
[58] Field of Search .................................. 385/27, 33, 24, 385/34, 31, 11; 372/703, 6; 359/124, 131

[56] References Cited

U.S. PATENT DOCUMENTS 5,796,889  8/1998  Xu et al. .................................... 385/24

*Primary Examiner*—Phan T. H. Palmer

[57] ABSTRACT

A structure allowing multiple optical paths through an optical isolator or the like with substantially no interaction. A lens collimates light from a first multiple fiber optic path termination. The collimated light is processed by an optical isolator unit or another optical processing unit such as a coupler. The processed light is reimaged onto a second multiple fiber optic path termination. Preferably, the optical paths in the first termination are in one-to-one correspondence with the optical paths in the second termination.

9 Claims, 1 Drawing Sheet

MULTIPLE PORT OPTICAL COMPONENT SUCH AS AN ISOLATER OR THE LIKE

CROSS-REFERENCE TO RELATED APPLICATION

This application claims priority of Provisional Application Ser. No. 60/019,952 which was filed on Jun. 14, 1996.

BACKGROUND OF THE INVENTION

1. Field of the Invention

This invention relates to optical components generally and, more specifically, to optical components having multiple ports.

2. Description of the Prior Art

Optical systems and subsystems, such as an exemplary fiber amplifier as shown in FIG. 3, utilize multiple optical isolators to provide isolation between various optical components in the amplifier. These isolators essentially allow only one way propagation of optical energy between the input and output of the isolator and may be of the type shown in U.S. Pat. No. 4,548,478, incorporated herein by reference. In the fiber amplifier 10 of FIG. 3, the isolators 11, 12 assure one-way amplification by Eb-doped fiber 13. Since the isolation function is duplicated in the amplifier, it is desirable to eliminate one of the components to reduce the cost of the fiber amplifier 10. An exemplary amplifier which utilizes the shared isolator is shown in FIG. 2. Here, the isolator 20 has two optical paths, each isolated from each other but sharing a common package. Such isolators were heretofore unavailable.

Therefore, there exists a need for a reliable technique for sharing in a common package an isolator with multiple optical paths therein with substantially no interaction between the paths.

SUMMARY OF THE INVENTION

Therefore, in accordance with one exemplary embodiment of the invention, an optical component, such as an isolator, is provided having, first and second optical terminations, first and second lenses disposed between the terminations, and an optical function unit disposed between the lenses. Each termination has a plurality of optical paths and each lens has first and second focal points. The first focal points of the first and second lenses are substantially coincident, and the second focal points of the lenses are substantially aligned with corresponding terminations. The optical function unit may be a conventional isolator.

Alternatively, the exemplary embodiment of the invention may be understood as operating with the steps of 1) collimating light from a first optical termination with a first plurality of optical paths; 2) optically processing the collimated light; 3) reimaging the processed collimated light onto a second termination with a second plurality of optical paths.

BRIEF DESCRIPTION OF THE DRAWING

The foregoing features of this invention, as well as the invention itself, may be more fully understood from the following detailed description of the drawings, in which.

DETAILED DESCRIPTION

Figure 1:
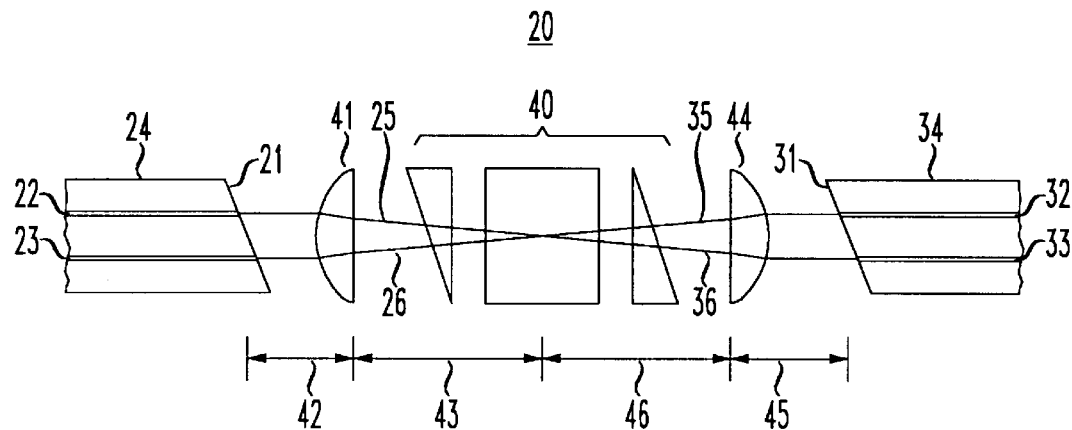
FIG. 1 is an exemplary representation (not to scale) of a an optical component according to one embodiment of the invention.
Figure 2:
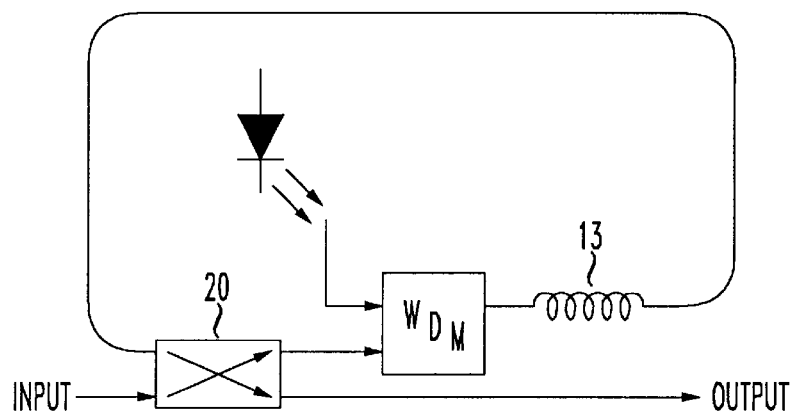
FIG. 2 is an illustrative fiber amplifier utilizing an optical isolator component as shown in FIG. 1.
Figure 3:
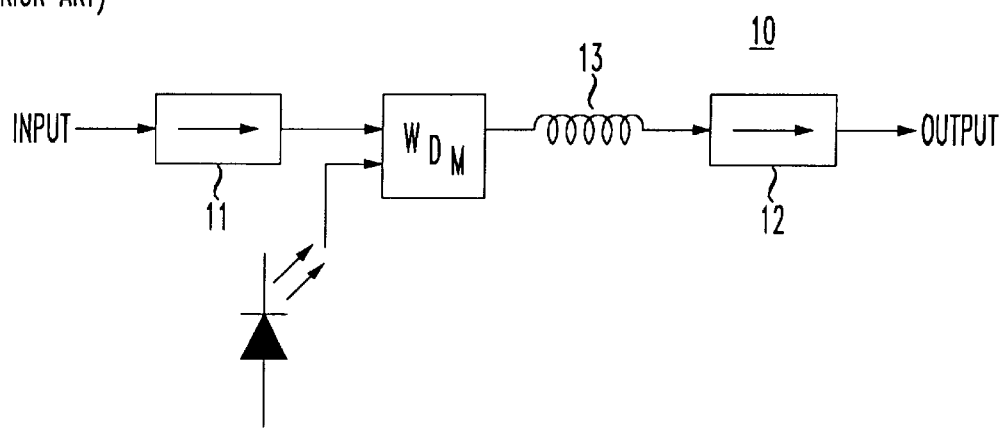
FIG. 3 is an illustrative prior art fiber amplifier.

Diagramed in FIG. 1 is an exemplary dual path optical isolator 20 according to one exemplary embodiment of the invention.

First optical termination 21 has two optical fibers 22, 23 disposed in a capillary 24 to rigidly hold the fibers 22, 23. Optical energy from or to the fibers 22, 23 are represented by respective rays 25, 26. Similarly, a second optical termination 31 has two optical fibers 32, 33 disposed in a capillary 34. It is preferable, but not essential, that terminations 21, 31 are beveled (greatly exaggerated in this diagram) to suppress reflections thereon from reentering the isolator 40. Optical energy to or from the fibers 32, 33 are represented by respective rays 35, 36.

An optical function unit 40 provides the desired optical function to the optical energy passing therethrough. In this embodiment, the unit 40 is an optical isolator, described in detail in the above-identified U.S. Patent. It is understood that other types of optical isolators may be used instead of the configuration shown. Further, other types of optical functions may be implemented, such as an optical modulator, a coupler (with and without filters), etc.

Lens 41 has a first focal point (not shown) at a first focal length 42 and a second focal point (not shown) at a second focal length 43. Similarly, lens 44 has a first focal point (not shown) at a first focal length 45 and a second focal point (not shown) at a second focal length 46. Lens 41 is positioned such that the first focal point thereof at focal length 42 is substantially aligned with the termination 21. Similarly, lens 44 is positioned such that the first focal point thereof at focal length 45 is substantially aligned with the termination 31. Further, the second focal points of both lenses 41, 44 are substantially coincident. The position of the focal points of the lenses 41, 44 may be adjusted somewhat ("tweaked") to vary the performance of the component 20. As a result, optical energy along ray 25 passes through unit 40 emerging along ray 36 while optical energy along ray 26 emerges along ray 35.

Functionally, lens 41 operates to collimate light from the fibers 22, 23 at termination 21. The unit 40 then process the collimated light. Lens 44 reimages the processed collimated light onto fibers 32, 33 at termination 31. Note that the above can be reversed when the unit 40 allows for optical energy to flow from termination 31 to termination 21.

The lenses 41, 44 are shown here as simple convex lenses, thereby having the same first and second focal lengths. Other exemplary types of simple lenses that can be used are graded index (GRIN), aspherical and ball lenses. Further, the lenses 41, 44 may be complex lenses such that the first and second focal lengths may be unequal.

While only two fibers are shown for each termination 21, 31, any number of fibers may be used. Preferably, the number of fibers at each termination 21, 31 are the same and in one-to-one correspondence. Corresponding alignment of the fiber ends at the terminations 21, 31 are preferably achieved by cleaving a capillary with all the fibers therein, thereby assuring precise alignment of the fiber ends on both terminations 21, 31.

Having described the preferred embodiment of this invention, it will now be apparent to one of skill in the art that other embodiments incorporating its concept may be used. Therefore, this invention should not be limited to the disclosed embodiment, but rather should be limited only by the spirit and scope of the appended claims.

We claim:

1. An optical component, CHARACTERIZED BY:

first and second optical terminations, each termination having a plurality of optical paths;

first and second lenses, each having first and second focal points, disposed between the terminations; and an optical function unit disposed between the lenses;

wherein the first focal points of the first and second lenses are substantially coincident, and the second focal points of the lenses are substantially aligned with corresponding terminations.

2. The optical component recited in claim 1, wherein optical function unit is an optical isolator assembly.

3. In an optical amplifier, an optical isolator as recited in claim 2.

4. The optical component recited in claim 1, wherein the lenses are simple lenses with substantially equal first and second focal lengths.

5. The optical component recited in claim 1, the plurality of optical paths being further characterized by having N optical paths and the optical paths in each termination in one to one correspondence with the optical paths in the other termination.

6. The optical component recited in claim 1, wherein the optical paths are optical fibers.

7. A method of performing an optical function, CHARACTERIZED BY THE STEPS OF:

collimating light from a first optical termination with a first plurality of optical paths;

optically processing the collimated light;

reimaging the processed collimated light onto a second termination with a second plurality of optical paths.

8. The method recited in claim 7, wherein the first plurality of optical paths are in one-to-one correspondence with the second plurality of optical paths.

9. The method recited in claim 8, wherein the optical processing step is characterized by the step of optical isolating the collimated light.

* * * * *